United States Patent
Nolen et al.

(10) Patent No.: US 11,349,281 B1
(45) Date of Patent: May 31, 2022

(54) FOLDABLE AND/OR COLLAPSIBLE PLASTIC/COMPOSITE UTILITY ENCLOSURE

(71) Applicant: AFL Telecommunications LLC, Duncan, SC (US)

(72) Inventors: Dustin Kyle Nolen, Mount Olive, AL (US); Raymond George Thompson, Hoover, AL (US); Selvum Pillay, Hoover, AL (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

(21) Appl. No.: 17/224,155

(22) Filed: Apr. 7, 2021

Related U.S. Application Data

(63) Continuation-in-part of application No. 16/663,391, filed on Oct. 25, 2019, now Pat. No. 11,008,134.
(Continued)

(51) Int. Cl.
*B65D 43/02* (2006.01)
*H02B 1/46* (2006.01)
(Continued)

(52) U.S. Cl.
CPC ........... *H02B 1/46* (2013.01); *B65D 11/1846* (2013.01); *B65D 43/0202* (2013.01); *H02G 3/081* (2013.01)

(58) Field of Classification Search
CPC .... B65D 88/76; B65D 11/1846; B65D 11/28; B65D 43/0202; B65D 43/02; B65D 90/10;
(Continued)

(56) References Cited

U.S. PATENT DOCUMENTS

| 533,750 A | 2/1895 | Ross |
| 941,014 A | 11/1909 | Doble |

(Continued)

FOREIGN PATENT DOCUMENTS

| CA | 2345843 C | 10/2002 |
| DE | 102005016491 B4 | 10/2006 |

(Continued)

OTHER PUBLICATIONS

Search Report for International Patent Application No. PCT/US2021/13500 dated Apr. 5, 2021; 1 page.

*Primary Examiner* — Don M Anderson
(74) *Attorney, Agent, or Firm* — Dority & Manning, P.A.

(57) ABSTRACT

A lid for a utility enclosure having a front end, a rear end, a right side, a left side, a top lid portion, and a bottom, defining an interior. Large reinforcement ribs are on an interior surface of the top lid portion and form a lattice-type structure. Small reinforcement ribs are mounted in spaces formed by the lattice type structure. The lid is made of glass fiber-reinforced polypropylene and metal bars or rebar are embedded in the large reinforcement ribs. The metal bars are positioned near a bottom of the large reinforcement ribs and spaced above the bottom. The physical structure of the lid and the lid's composition, consisting essentially of glass fiber-reinforced polypropylene, are constructed so that the lid withstands up to 33,750 pounds of force without breaking or being deformed.

12 Claims, 12 Drawing Sheets

Related U.S. Application Data

(60) Provisional application No. 62/751,278, filed on Oct. 26, 2018.

(51) Int. Cl.
*B65D 6/18* (2006.01)
*H02G 3/08* (2006.01)

(58) Field of Classification Search
CPC ....... B65D 90/105; B65D 2543/00398–00416; H02G 3/081; H02G 3/086; H02G 3/088; H02G 3/14; H02G 9/04; H02G 9/00; H02G 2200/10; H02B 1/46; H02B 1/48; E05G 1/026; H05K 5/0217; H05K 5/0239; H05K 5/03; E02D 29/14
See application file for complete search history.

(56) References Cited

U.S. PATENT DOCUMENTS

| | | | |
|---|---|---|---|
| 1,279,083 A | 9/1918 | Thweatt | |
| 1,441,343 A | 1/1923 | Derick | |
| 2,555,754 A | 6/1951 | Morin | |
| 2,941,710 A | 6/1960 | Smith | |
| 3,000,049 A | 9/1961 | Terry, Jr. | |
| 3,164,281 A | 1/1965 | Wiliam, Jr. | |
| 3,321,565 A | 5/1967 | Peterson | |
| 3,631,584 A | 1/1972 | Walkup | |
| 3,968,601 A | 7/1976 | Brown | |
| D245,102 S | 7/1977 | Gross | |
| 4,163,503 A | 8/1979 | McKinnon | |
| 4,265,365 A | 5/1981 | Boteler | |
| 4,266,670 A | 5/1981 | Mykleby | |
| 4,579,709 A | 4/1986 | Ferreri | |
| 4,809,402 A | 3/1989 | Rainville | |
| 4,820,383 A | 4/1989 | Shchamorov | |
| 4,863,059 A | 9/1989 | Christensen | |
| 5,288,453 A | 2/1994 | Rutenbeck | |
| 5,462,383 A | 10/1995 | Van T Veer | |
| 6,138,851 A | 10/2000 | Townson | |
| 6,261,499 B1 | 7/2001 | Okeke | |
| 6,269,966 B1 | 8/2001 | Pallo | |
| 6,325,962 B1 | 12/2001 | Kmiecik | |
| D478,672 S | 8/2003 | Charlebois | |
| 6,669,044 B2 | 12/2003 | Murakami | |
| 6,749,080 B1 | 6/2004 | White | |
| 6,861,584 B2 | 3/2005 | Hutchin | |
| 7,030,315 B1 | 4/2006 | Dunn | |
| 7,115,311 B2 | 10/2006 | Arthurs | |
| 7,163,352 B2 | 1/2007 | Jurich | |
| 7,234,275 B1 | 6/2007 | Haggy | |
| 7,320,768 B2 | 1/2008 | Eimura | |
| 7,381,888 B2 | 6/2008 | Burke | |
| 7,385,137 B2 | 6/2008 | Burke | |
| 7,406,240 B2 | 7/2008 | Murano | |
| 7,501,573 B2 | 1/2009 | Balfour, Jr. | |
| 7,513,385 B2 | 4/2009 | Flynn | |
| 7,633,742 B2 | 12/2009 | Standish | |
| 7,802,402 B2 | 9/2010 | Skaggs | |
| 7,807,923 B2 | 10/2010 | Moran | |
| 7,880,641 B2 | 2/2011 | Parris | |
| 8,096,439 B2 | 1/2012 | Fogerlie | |
| 8,249,411 B2 | 8/2012 | Burke | |
| 8,302,796 B1 | 11/2012 | Johnson | |
| 8,307,604 B2 | 11/2012 | Stepanian | |
| 8,534,484 B2 | 9/2013 | Rost | |
| 8,561,641 B2 | 10/2013 | Ogden | |
| D693,908 S | 11/2013 | Rost | |
| D693,909 S | 11/2013 | Rost | |
| 8,686,909 B2 | 4/2014 | Frank | |
| 8,847,070 B2 | 7/2014 | Burke | |
| 8,796,548 B2 | 8/2014 | Rost | |
| 9,265,162 B2 | 2/2016 | Kang | |
| 9,287,693 B2 | 3/2016 | Burke | |
| 9,809,960 B2 | 3/2017 | Wiley | |
| 9,768,592 B2 | 9/2017 | Unger | |
| 9,876,340 B2 | 1/2018 | Unger | |
| 9,917,427 B2 | 3/2018 | Rost | |
| 10,132,052 B2 | 11/2018 | Dang | |
| 10,136,530 B2 | 11/2018 | Dang | |
| D841,279 S | 2/2019 | Freeman | |
| 10,256,616 B1 | 4/2019 | Schweinberg | |
| 10,305,268 B2 | 5/2019 | Unger | |
| 10,428,487 B2 | 10/2019 | Cassidy | |
| 10,479,563 B2 | 11/2019 | Tramm | |
| 10,547,168 B2 | 1/2020 | Tipton | |
| 10,804,644 B2 | 4/2020 | Cretella | |
| 10,656,363 B2 | 5/2020 | Elford | |
| 10,840,682 B2 | 11/2020 | Tipton | |
| 11,008,134 B2 | 1/2021 | Nolen | |
| 11,008,728 B2 | 5/2021 | Turner | |
| 11,014,705 B2 | 5/2021 | Strange | |
| 11,040,800 B2 | 6/2021 | Mcdade | |
| 11,046,480 B2 | 6/2021 | Mccrea | |
| 11,050,229 B2 | 6/2021 | Baker | |
| 11,059,666 B2 | 7/2021 | Lanigan | |
| 11,072,904 B2 | 7/2021 | Chudley | |
| 2007/0158345 A1 | 7/2007 | Booth | |
| 2008/0134466 A1 | 6/2008 | Massengill | |
| 2008/0190950 A1* | 8/2008 | Orr | B65D 43/0202 220/782 |
| 2009/0266813 A1* | 10/2009 | Afflerbach | B65D 11/1873 220/4.01 |
| 2010/0175904 A1 | 7/2010 | Hebert | |
| 2012/0228302 A1 | 9/2012 | Byrns | |
| 2016/0297607 A1* | 10/2016 | Burke | B32B 17/04 |
| 2018/0100284 A1 | 4/2018 | Isaacson | |
| 2019/0301127 A1* | 10/2019 | Dang | E04C 5/07 |
| 2019/0345743 A1 | 11/2019 | Fisher | |
| 2020/0122886 A1 | 4/2020 | Barlier | |
| 2021/0086979 A1 | 3/2021 | Guerdrum | |
| 2021/0171237 A1 | 6/2021 | Hsu | |

FOREIGN PATENT DOCUMENTS

| | | |
|---|---|---|
| DE | 102005037997 A1 | 2/2007 |
| DE | 202020000904 U1 | 6/2021 |
| EM | D210289 | 8/2020 |
| EP | 1515409 B1 | 3/2005 |
| EP | 1461259 B1 | 8/2006 |
| EP | 2166392 B1 | 3/2010 |
| EP | 2166393 B1 | 3/2010 |
| EP | 2177668 A2 | 4/2010 |
| EP | 2357284 B1 | 8/2011 |
| EP | 2604758 B1 | 6/2013 |
| EP | 2607938 B1 | 6/2013 |
| EP | 2631370 B1 | 8/2013 |
| EP | 2738584 B1 | 6/2014 |
| EP | 2878734 B1 | 6/2015 |
| EP | 3029218 B1 | 6/2016 |
| EP | 3300196 B1 | 3/2018 |
| EP | 3483343 A1 | 5/2019 |
| EP | 3536860 A1 | 9/2019 |
| EP | 3567688 A1 | 11/2019 |
| FR | 2933993 B1 | 1/2010 |
| GB | 2324324 B | 10/1998 |
| GB | 2394968 B | 5/2004 |
| GB | 2404409 B | 2/2005 |
| GB | 2436341 B | 9/2007 |
| GB | 2450930 B | 1/2009 |
| GB | 2520784 A | 6/2015 |
| GB | 2576181 A | 2/2020 |
| GB | 2576444 A | 2/2020 |
| WO | WO2015107355 A2 | 7/2015 |
| WO | WO2016022481 A1 | 2/2016 |
| WO | WO2016168497 A1 | 10/2016 |
| WO | WO2020011334 A1 | 1/2020 |
| WO | WO2020072736 A1 | 4/2020 |
| WO | WO2021042950 A1 | 3/2021 |
| WO | WO2021107628 A1 | 6/2021 |

* cited by examiner

FOLDABLE AND/OR COLLAPSIBLE PLASTIC/COMPOSITE UTILITY ENCLOSURE

CROSS-REFERENCE TO RELATED APPLICATION

This application is a continuation in part of U.S. patent application Ser. No. 16/663,391, filed on Oct. 25, 2019, the contents of that application being incorporated herein by reference in its entirety.

FIELD OF THE INVENTION

The invention relates to underground utility enclosures for providing protection for below ground devices such as water meters, valves, telecom hardware, and the like and, more particularly, to a foldable and/or collapsible plastic/composite utility enclosure.

BACKGROUND OF THE INVENTION

Utility enclosures are used to protect buried meters, valves, and telecom hardware and need to be capable of withstanding heavy loads that may be placed on the cover of the utility enclosure. Concrete utility enclosures are commonly used in or near roadways and driveways since they are heavy duty and are capable of withstanding heavy loads placed on the cover. Concrete utility enclosures are formed by a wall of concrete that extends around the utility. A lip extends about the top of the utility enclosure in the interior of the utility enclosure. The cover of the utility enclosure fits into the interior of the utility enclosure and rests on the lip. The concrete lip provides sufficient support to the cover to enable the utility enclosure to withstand the force of heavy loads.

Concrete utility enclosures present some disadvantages, however. Concrete utility enclosures are difficult to transport and install. They are bulky and take up space. During transport, concrete utility enclosures are prone to being chipped, and significant amounts of concrete utility enclosures become non-usable because of damage incurred in transport. Installation of concrete utility enclosures is difficult because of the weight of the utility enclosures. Installation of a concrete utility enclosure generally requires the effort of two people because the utility enclosures weigh in excess of two hundred pounds each. The weight of the concrete utility enclosures also presents some danger of physical injury to the persons installing the utility enclosure.

Plastic utility enclosures are known. U.S. Pat. No. 5,333,750 discloses a plastic utility enclosure that is durable, lightweight, and capable of being located in roadways or driveways and withstanding heavy loads. However, plastic utility enclosures also are bulky and take up space during transportation. What is needed is a foldable utility enclosure that takes up reduced space when folded.

SUMMARY OF THE INVENTION

This invention is a foldable plastic/composite utility enclosure having a first side, a second side opposite the first side, a third side, and a fourth side opposite the third side. Each of the sides has a first end and a second opposite end. The first end of the first side is connected to the first end of the third side by means of a first hinge. The second opposite end of the second side is connected to the second opposite end of the third side by means of a second hinge. The second opposite end of the first side is connected to the second opposite end of the fourth side by means of a third hinge. The first end of the second side is connected to the first end of the fourth side by means of a fourth hinge.

The third side is constructed to rotate on the first and second hinges only away from the first side. The fourth side is constructed to rotate on the third and fourth hinges only towards the first side. The third side and the fourth side are constructed to rotate until the first side engages the second side and the foldable plastic/composite utility enclosure is in a folded configuration. The folded plastic/composite utility enclosure when in a folded configuration has only 15 to 20 percent of the thickness compared to an unfolded configuration.

The first end of the first side and the first end of the second side are curved. The first end of the third side is positioned slideably over the first end of the first side and the first end of the fourth side is positioned slideably over the first end of the second side. The second opposite end of the first side abuts against the second opposite end of the fourth side and the second opposite end of the third side abuts against the second opposite end of the second side. The second opposite ends are angled.

Each hinge consists of hinge members wherein each hinge member is positioned in a housing. The housing has an open interior to help anchor the housing in the ground. Each edge of each side has a plurality of spaced-apart hinge members wherein hinge members on one side engage the hinge members on another side to form the hinge. One or more of the hinges may have a reversibly insertable locking pin that prevents the sides from rotating on the hinges and prevents the foldable plastic/composite utility enclosure from folding.

The foldable and/or collapsible plastic/composite utility enclosure of this invention can be made of any type of plastic or composite, preferably plastic imbedded with fibers such as carbon fibers, glass fibers, or ceramic fibers or imbedded with particles such as glass particles. The use of plastic/composite and various openings or cutouts makes the utility enclosure light weight. The hinges allow the utility enclosure to be folded flat for storage and transportation. The pairs of sides are symmetrical which facilitates manufacturing. The foldable plastic/composite utility enclosure is ideal for housing underground utilities. However, it can be used to house or contain any desired device.

A preferred embodiment of a lid for the utility enclosure has a front end, a rear end, a right side, a left side, a top lid portion, and a bottom, defining an interior. First reinforcement ribs are on an interior surface of the top lid portion. Metal bars are embedded in the first reinforcement ribs. The lid is made, preferably, of glass fiber-reinforced polypropylene.

The first reinforcement ribs form a lattice-type structure, with second reinforcement ribs mounted in spaces formed by the lattice type structure. The metal bars are positioned in the first reinforcement ribs near a bottom of the first reinforcement ribs and are spaced above the bottom of the first reinforcement ribs. The top lid portion has a recess with a lift pin therein. A lifting tool can be inserted into the recess and under the lift pin to lift the lid off a utility enclosure. The top lid portion may have bolt holes to bolt the lid to the utility enclosure. The lid is constructed to withstand up to 33,750 pounds of force without breaking or being deformed.

DETAILED DESCRIPTION OF THE INVENTION

While the following description details the preferred embodiments of the present invention, it is to be understood that the invention is not limited in its application to the details of arrangement of the parts or the illustrations disclosed herein, since the invention is capable of other embodiments and of being practiced in various ways.

Figure 1:
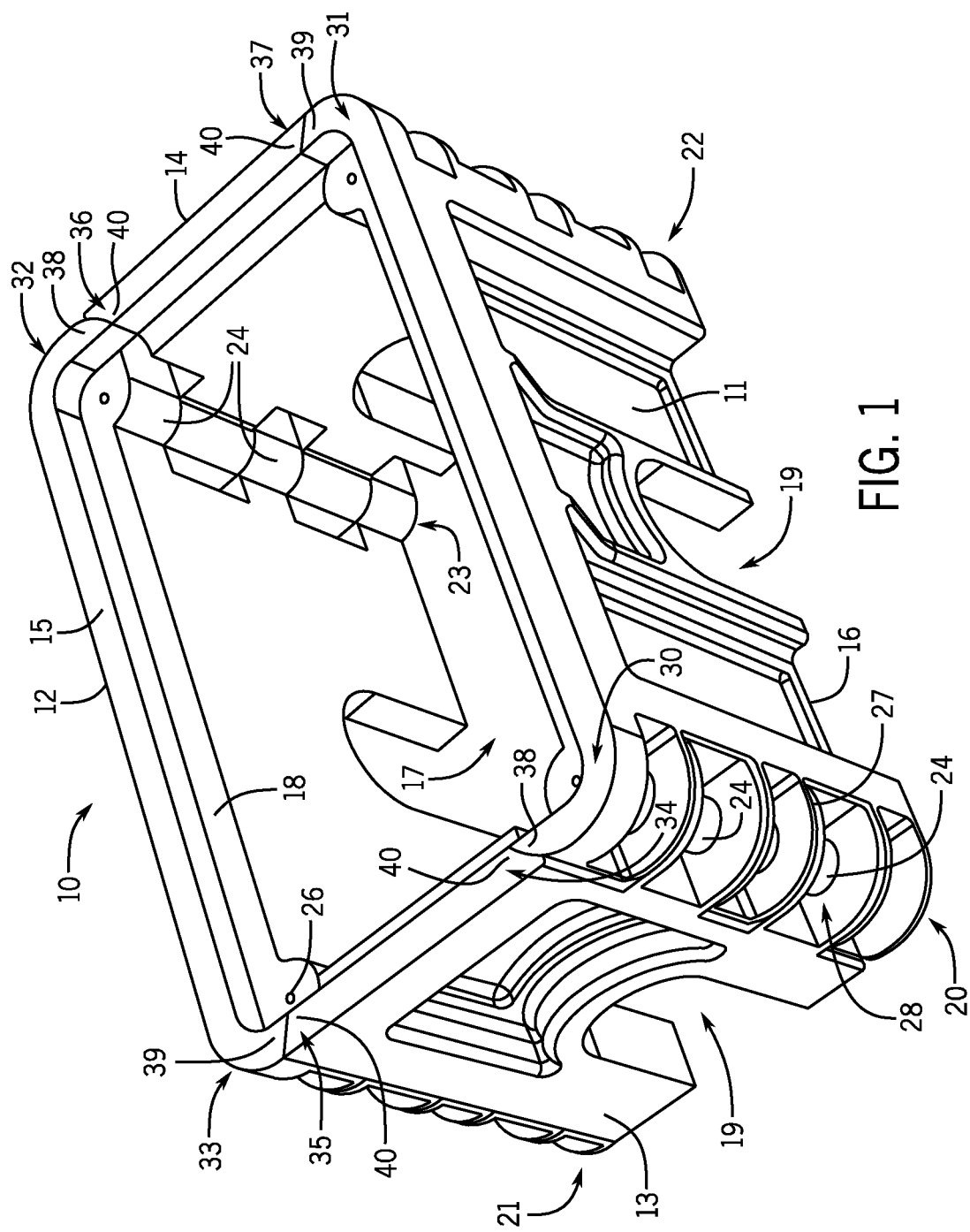
FIG. 1 is a top, front, perspective view of the utility enclosure of the present invention.

FIG. 1 is a top, front, perspective view of the utility enclosure 10 of the present invention. The utility enclosure 10 is rectangular and has a first side 11, a second side 12 opposite the first side 11, a third side 13, and a fourth side 14 opposite the third side 13. The first side 11 and the second side 12 form a first pair of sides and the third side 13 and the second side 14 form a second pair of sides. The utility enclosure 10 has a top end 15, a bottom end 16, and an interior 17. An interior ledge 18 is formed on each side in the interior 17 near the top end 15 to support a cover (see FIGS. 11 and 12) or an extension enclosure 80 (See FIG. 16). The edges of each side 11, 12, 13, and 14 are joined together with hinges 20, 21, 22, and 23 to form the rectangular utility enclosure 10, with a hinge in each corner of the rectangle. The hinges 20, 21, 22, and 23 are made up of hinge members 24. Each hinge member 24 has a central hole 25 (see FIGS. 2A and 2B) for the insertion of a hinge pin 26 to form the hinge, as is known in the art. The hinge members 24 are formed in open hollow housings 27, the housings 27 having interiors 28.

First side 11 has a first end 30 and a second opposite end 31. The second side 12 has a first end 32 and a second opposite end 33. The third side 13 has a first end 34 and a second opposite end 35. The fourth side 14 has a first end 36 and a second opposite end 37. The first ends 30 and 32 of the sides 11 and 12 (first pair of sides) form curved corners which end with curved extensions 38. The second opposite ends 31 and 33 of sides 11 and 12 are also curved and form acute angles 39. The first ends 34 and 36 of sides 13 and 14 (second pair of sides) and the second opposite ends 35 and 37 of sides 13 and 14 form obtuse angles 40. The first ends 34 and 36 of the sides 13 and 14 fit over the curved extensions 38 of sides 11 and 12 and the first ends 34 and 36 may be slightly curved to match the curved extensions 38. The second opposite end 35 of the third side 13 forms an obtuse angle 40 between an interior surface 45 (see FIG. 3B) of the third side 13 and an interior surface 42 (see FIG. 2B) of the first side 11. The obtuse angle 40 extends from the top end 15 of the utility enclosure 10 to the bottom end 16 of the utility enclosure 10. The second opposite end 37 of the fourth side 14 forms an acute angle 39 between an interior surface 45A of the fourth side 14 and an interior surface 42 of the first side 11 and the acute angle 39 extends from the top end 15 of the utility enclosure 10 to the bottom end 16 of the utility enclosure 10. The angled edges of the second opposite ends 35 and 37 of sides 13 and 14 abut the angled edges of the ends 31 and 33 of the sides 11 and 12. The sides 11, 12, 13, and 14 may have openings 19 to accommodate wires, pipes, tubing, and the like.

Figure 2A:
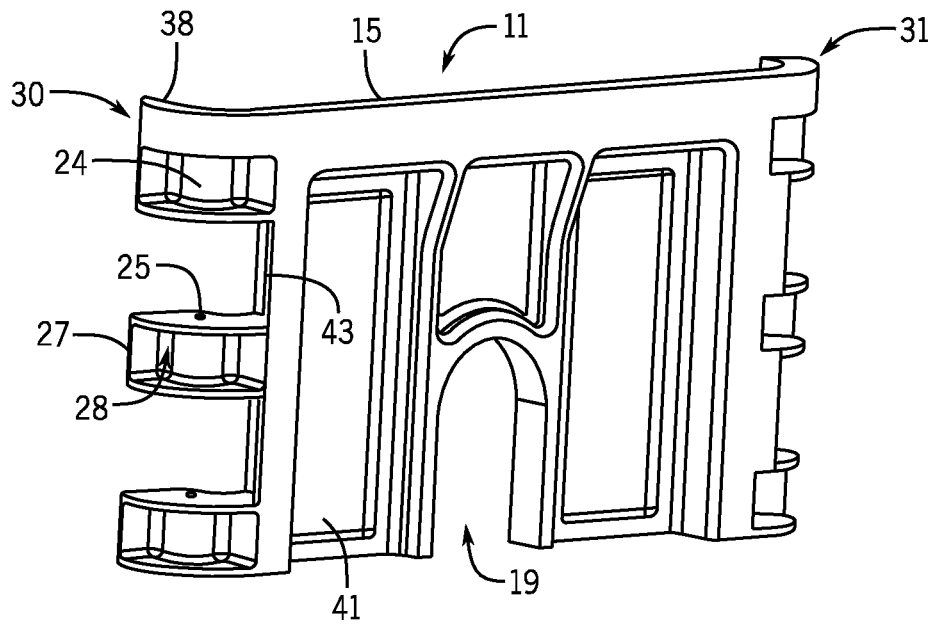
FIG. 2A is perspective view from an exterior surface of a first side the utility enclosure.
Figure 2B:
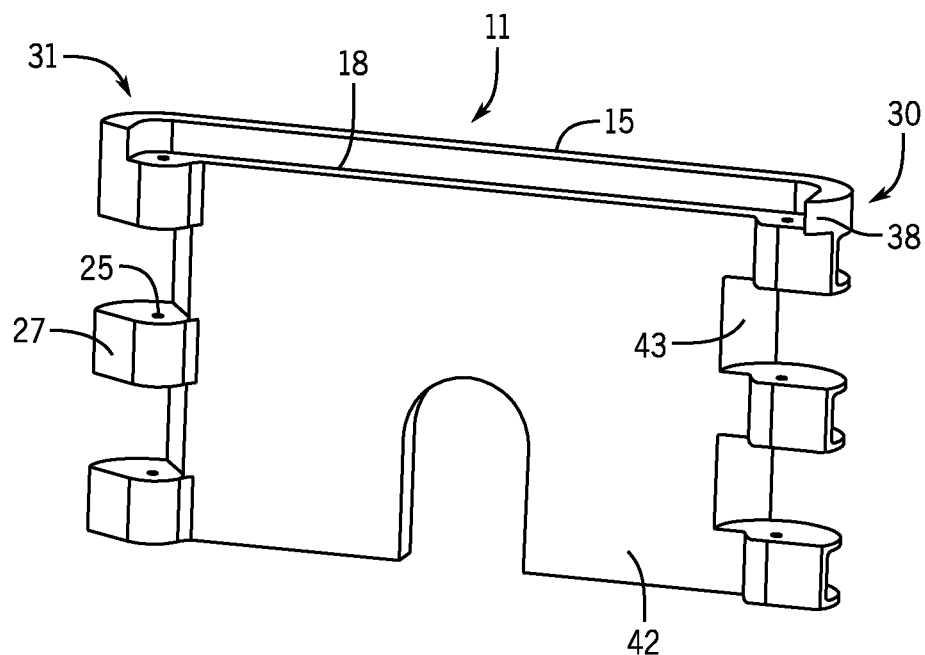
FIG. 2B is a perspective view from an interior surface of the first side.

FIG. 2A is perspective view from an exterior surface 41 of the first side 11, separated from the utility enclosure 10, and FIG. 2B is a perspective view from an interior surface 42 of the first side 11. The hinge members 24, the housings 27, and the interiors 28 can be seen in more detail. Grooves or spaces 43 between the hinge members 24 accommodate the housings 27 of the hinge members 24 that engage the first side 11 to complete the formation of the hinges 23.

Figure 3A:
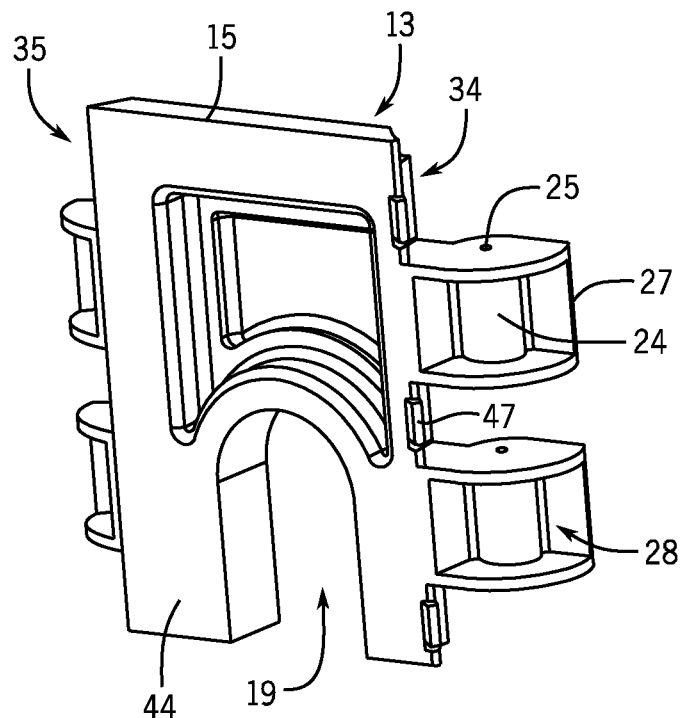
FIG. 3A is perspective view from an exterior surface of a third side.
Figure 3B:
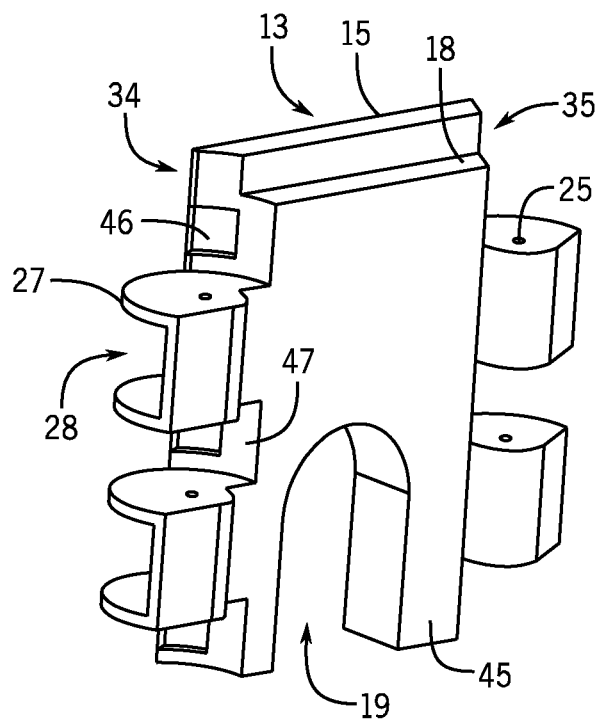
FIG. 3B is a perspective view from an interior surface of the third side.

FIG. 3A is perspective view from an exterior surface 44 of the third side 13 separated from the utility enclosure 10 and FIG. 3B is a perspective view from an interior surface 45. The hinge members 24, the housings 27, and the interiors 28 can be seen in more detail. FIGS. 3A and 3B further show latches 46 which lock the third side 13 to the first side 11 to prevent the utility enclosure 10 from folding. Grooves 47 between the hinge members 24 accommodate the housings 27 of the hinge members 24 that engage the third side 13 to complete the formation of the hinges 20, 21, 22, 23.

The housings 27 strengthen the hinges 20, 21, 22, 23 and protect them from external forces. When the utility enclosure 10 is placed in the ground to protect an underground device, soil, rocks, and cement can fill the interiors 28 of the housings 27 which will prevent the utility enclosure 10 from moving or folding. The first side 11 and the second side 12 are identical to each other and the third side 13 and the fourth side 14 are identical to each other with regard to hinging and folding features.

Figure 4:
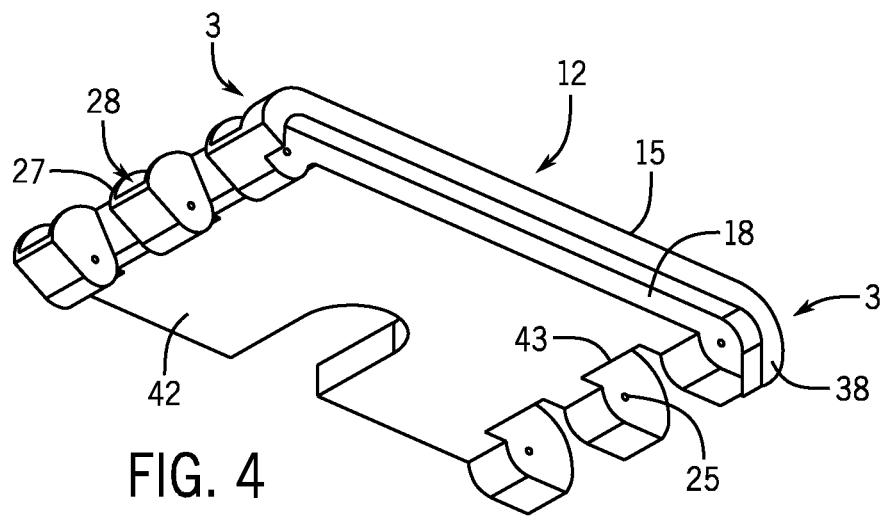
FIG. 4 is a top, interior surface view of the second side of the utility enclosure.
Figure 5:
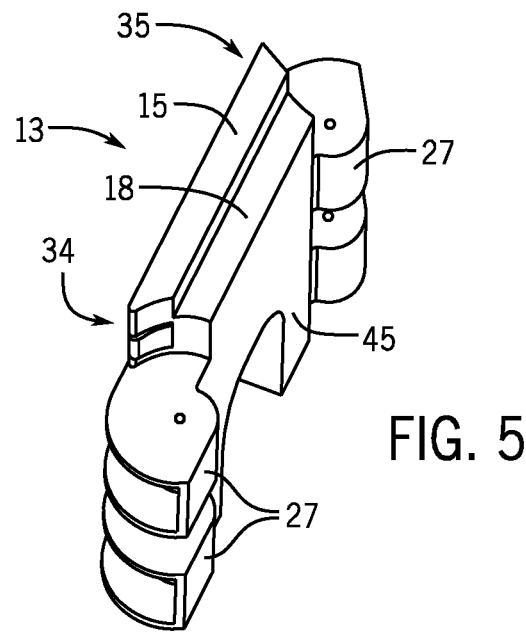
FIG. 5 is a top, interior surface view of the third side of the utility enclosure.
Figure 6:
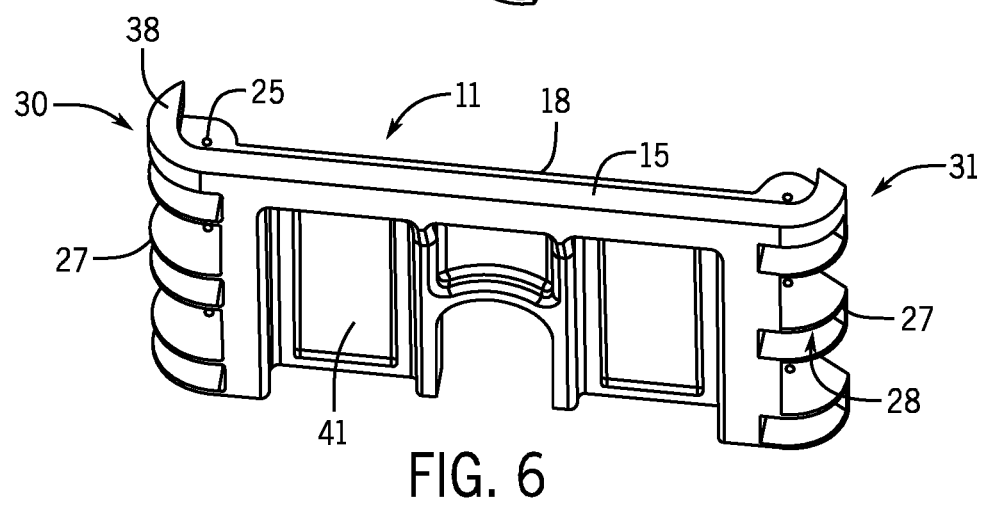
FIG. 6 is a top, exterior surface view of the first side of the utility enclosure.

FIG. 4 is a top, interior surface view of the second side 12. FIG. 5 is a top, interior surface view of the third side 13. FIG. 6 is a top, exterior surface view of the first side 11. The utility enclosure 10 is formed by inserting the housings 27 on end 35 of the third side 13 in between the housings 27 on end 31 of the second side 12 and inserting the housings 27 on end 34 of the third side 13 in between the housings 27 on end 30 of the first side 11. The pins 26 are then inserted through the holes 25 to form the hinges 20, 21, 22, 23. The fourth side 14 is added to sides 11 and 12 in the same way to complete the assembly of the utility enclosure 10.

Figure 7A:
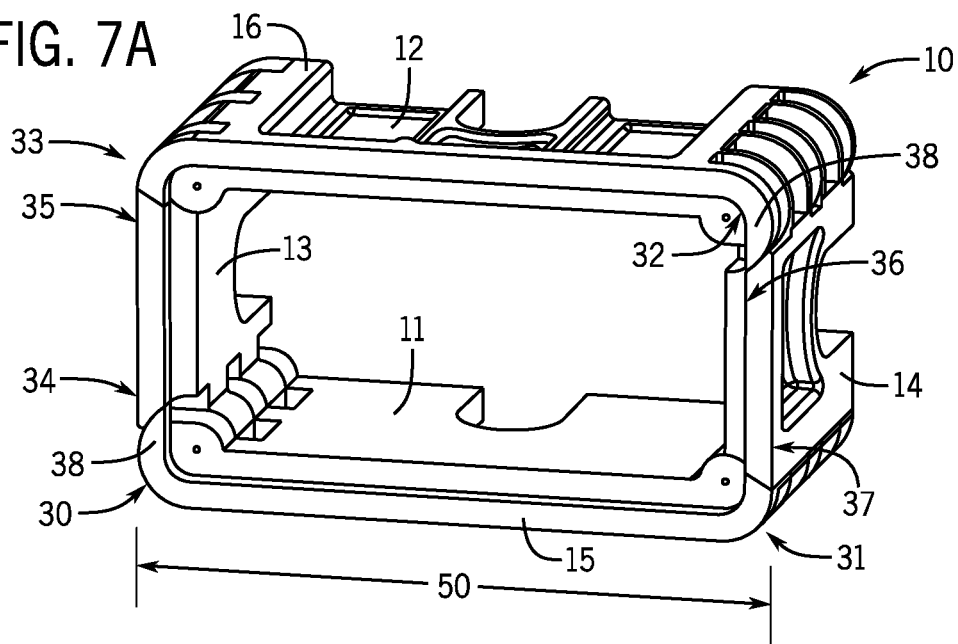
FIG. 7A is a top perspective view of the utility enclosure laying with its first side on a horizontal plane in an unfolded configuration.
Figure 7B:
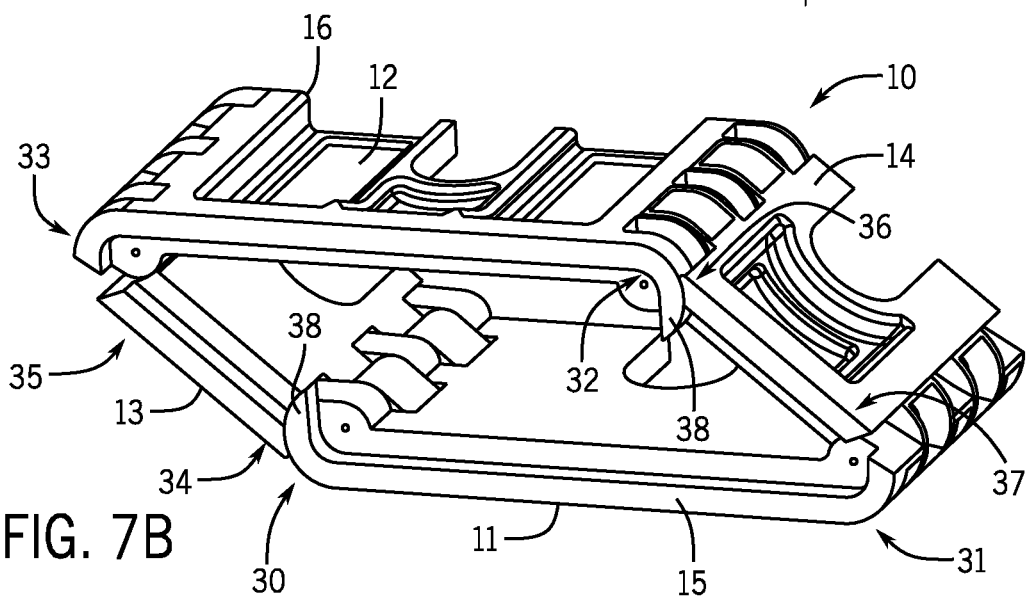
FIG. 7B shows the utility enclosure of FIG. 7A in a semi-folded configuration.
Figure 7C:
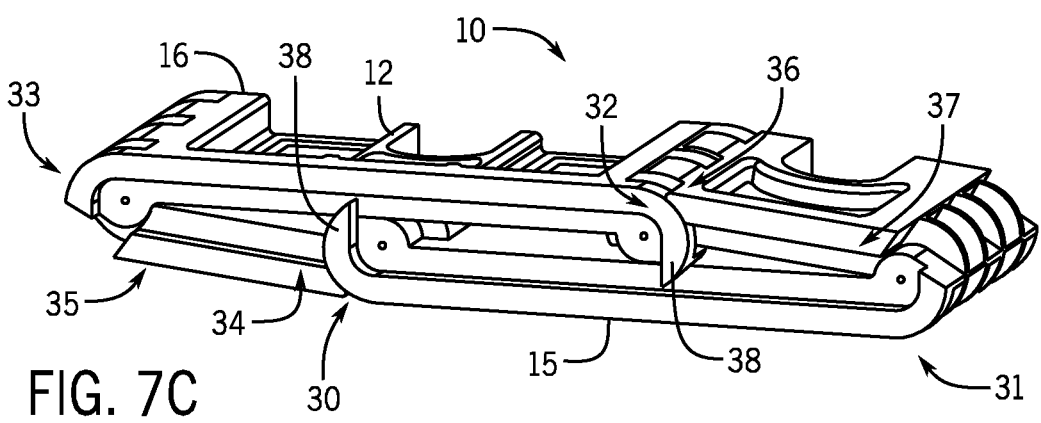
FIG. 7C shows the utility enclosure of FIG. 7A in a completely folded configuration.
Figure 8A:
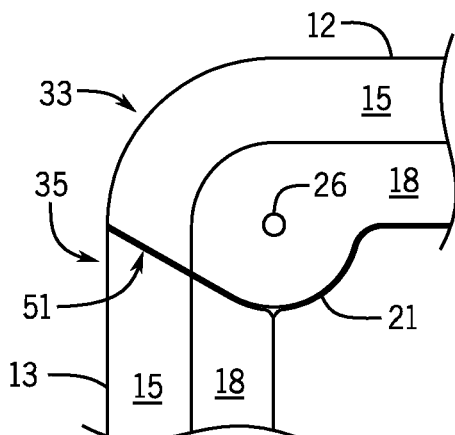
FIG. 8A shows an enlarged top view of an end of a second side and an end of the third side in an unfolded configuration.
Figure 8B:
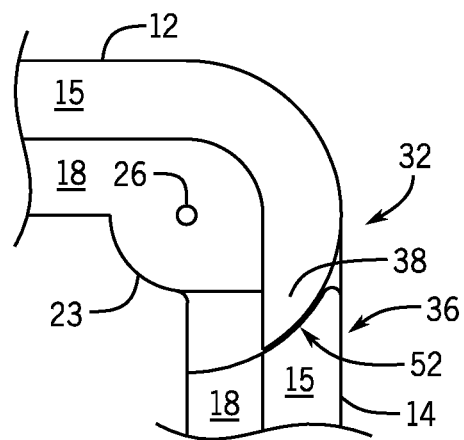
FIG. 8B show an enlarged top view of the end of the second side and an end of a fourth side in an unfolded configuration.

FIG. 7A is a top perspective view of the utility enclosure 10 laying with its first side 11 on a horizontal plane, shown by double arrow 50. The utility enclosure 10 is in an unfolded configuration. FIG. 7B shows the utility enclosure 10 in a semi-folded configuration. FIG. 7C shows the utility enclosure 10 in a completely folded configuration. As the second side 13 is rotated away from the first side 11 the fourth side 14 is rotated towards the first side 11. The second side 12 moves inward towards the first side 11. In the folded configuration the utility enclosure 10 has about 15% to 25% of the thickness, compared to the unfolded configuration, preferably about 20%. FIG. 8A shows an enlarged top view of the end 33 of the second side 12 and the end 35 of the third side 13 in an unfolded configuration. FIG. 8B shows an enlarged top view of the end 32 of the second side 12 and the end 36 of the fourth side 14 in an unfolded position. The utility enclosure 10 cannot fold in a direction opposite to that shown in FIGS. 9A, 9B, 10A, and 10C because the end 35 of side 13 abuts the end 33 of side 12, shown by arrow 51, at an angle relative to sides 12 and 13. The end 35 of side 13 cannot move around the end 33 of side 12. However, the end 36 of side 14 can move around end 32 of side 12, as shown in FIGS. 9A, 9B, 10A, and 10C, because end 36 overlaps end 32, shown by arrow 52.

Figure 9A:
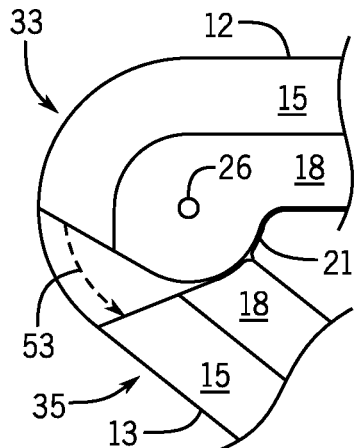
FIGS. 9A and 9B show the same views as 8A and 8B but with the utility enclosure in a semi-folded configuration.
Figure 9B:
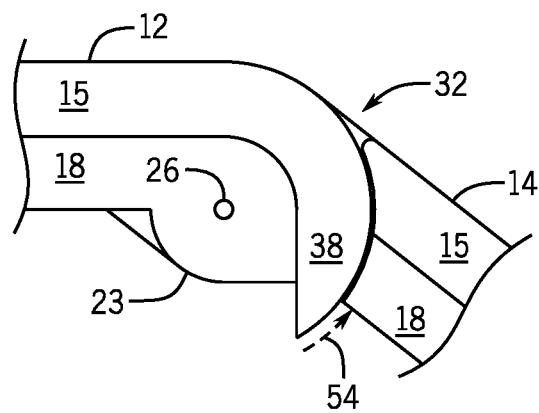
Figure 10A:
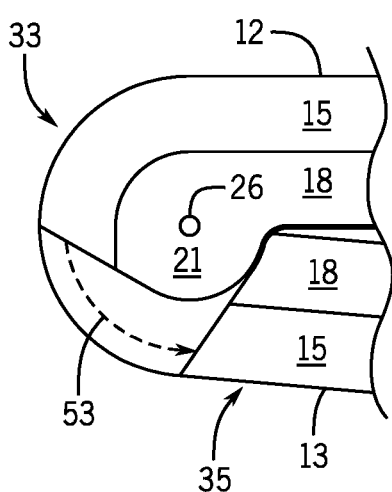
FIGS. 10A and 10B show the same views 8A and 8B but with the utility enclosure in a completely folded configuration.
Figure 10B:
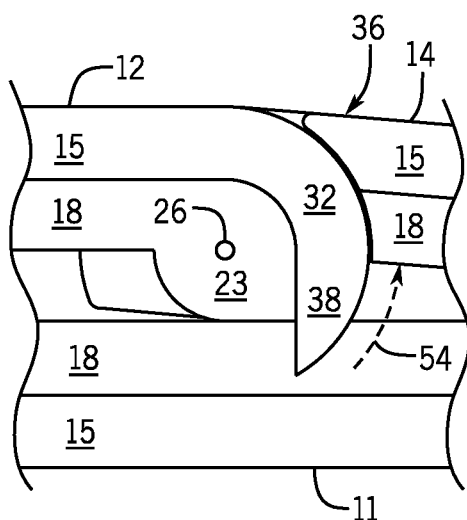

FIGS. 9A and 9B show the same views as FIGS. 8A and 8B but with the utility enclosure 10 in a semi-folded configuration. Arrow 53 in FIG. 9A shows the extent to which end 35 of side 13 has moved away from end 33 of side 12. Arrow 54 in FIG. 9B shows the extent to which end 36 of side 14 has moved over and around the curved extension 38 of end 32 of side 12. FIGS. 10A and 10B show the same views as FIGS. 8A and 8B but with the utility enclosure 10 in a completely folded configuration with the first side 11 engaging the second side 12. The folding of the utility enclosure 10 is reversible and the utility enclosure 10 can be restored to its unfolded configuration by pulling the first side 11 and the second side 12 apart.

Figure 11:
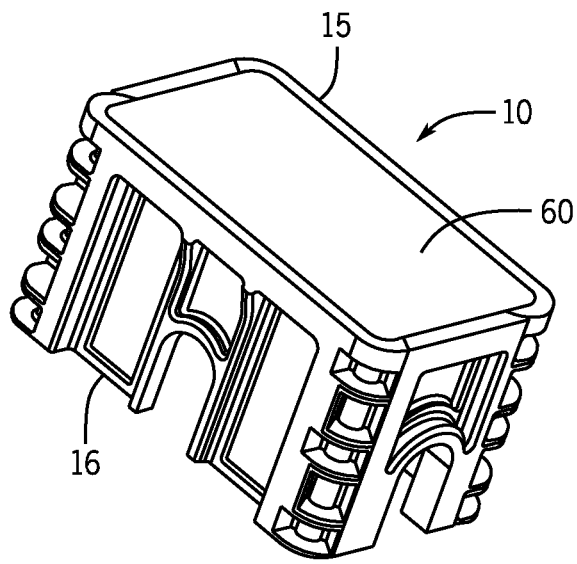
FIG. 11 shows a top perspective view of the utility enclosure with a top cover inserted in a top end of the utility enclosure.
Figure 12:
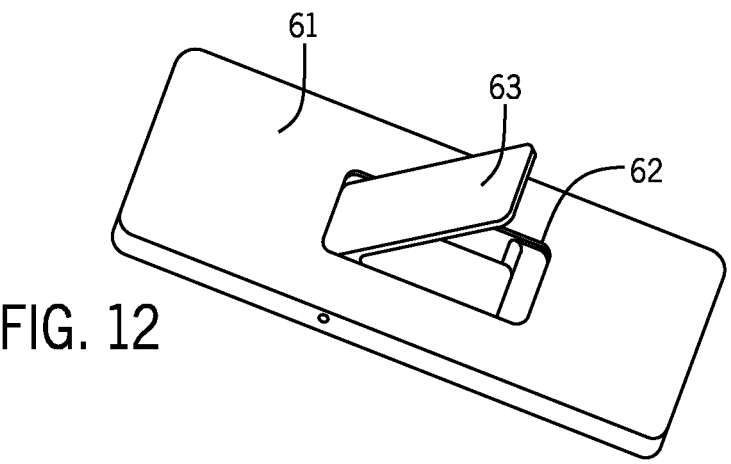
FIG. 12 shows a top perspective view of the top cover having an opening with a door.

FIG. 11 shows a top perspective view of the utility enclosure 10 with a top cover 60 inserted in the top end 15. The top cover 60 can have handles or openings for removing the cover 60. FIG. 12 shows a top perspective view of a top cover 61 having an opening 62 with a door 63. The interior 17 of the utility enclosure 10 can be viewed and accessed by raising the door 63.

Figure 13:
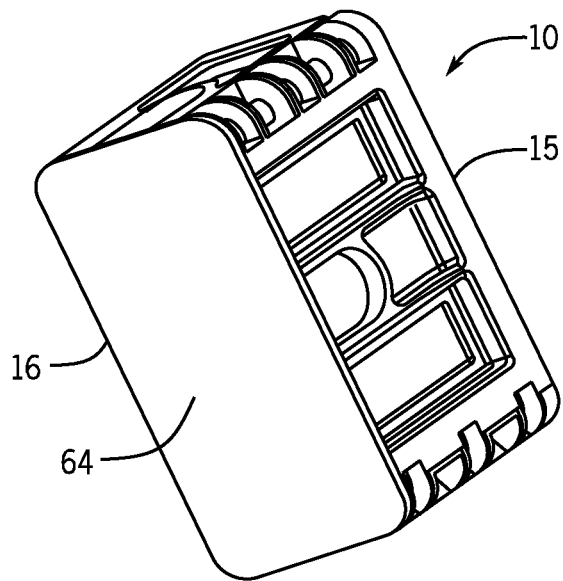
FIG. 13 shows a bottom perspective view of the utility enclosure with a bottom cover attached reversibly to a bottom end of the utility enclosure.

FIG. 13 shows a bottom perspective view of the utility enclosure 10 with a bottom cover 64 attached reversibly to the bottom end 16 by methods known in the art. The use of a bottom cover 64 allows the utility enclosure 10 to be used as any type of utility enclosure for any type of articles.

Figure 14:
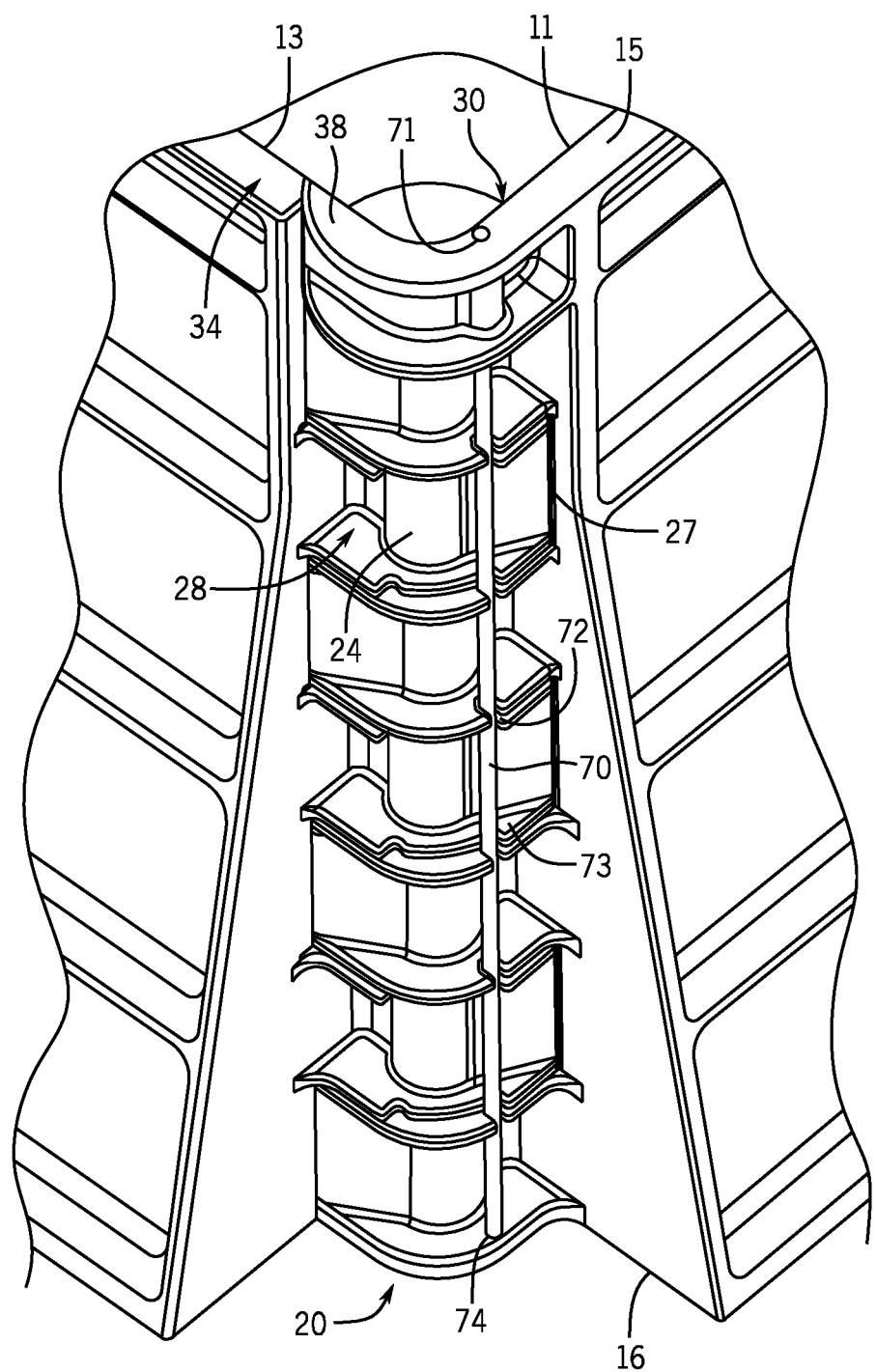
FIG. 14 shows a perspective view of corner with a hinge connecting two sides, with a locking pin inserted through the hinge members to prevent rotation of the sides on the hinge and to prevent folding of the foldable plastic utility enclosure.

FIG. 14 shows a perspective view of corner with a hinge connecting two sides, with a locking pin 70 inserted through the hinge members 24 to prevent rotation of the sides on the hinge and to prevent folding of the foldable plastic/composite utility enclosure. An insertion hole 71 is on the top end 15 to insert the locking pin 70. Each hinge member 24 has an upper groove 72 and a bottom groove 73 through which the locking pin 70 passes. The locking pin 70 can be retained in an opening 74 in the bottom hinge member.

Figure 15:
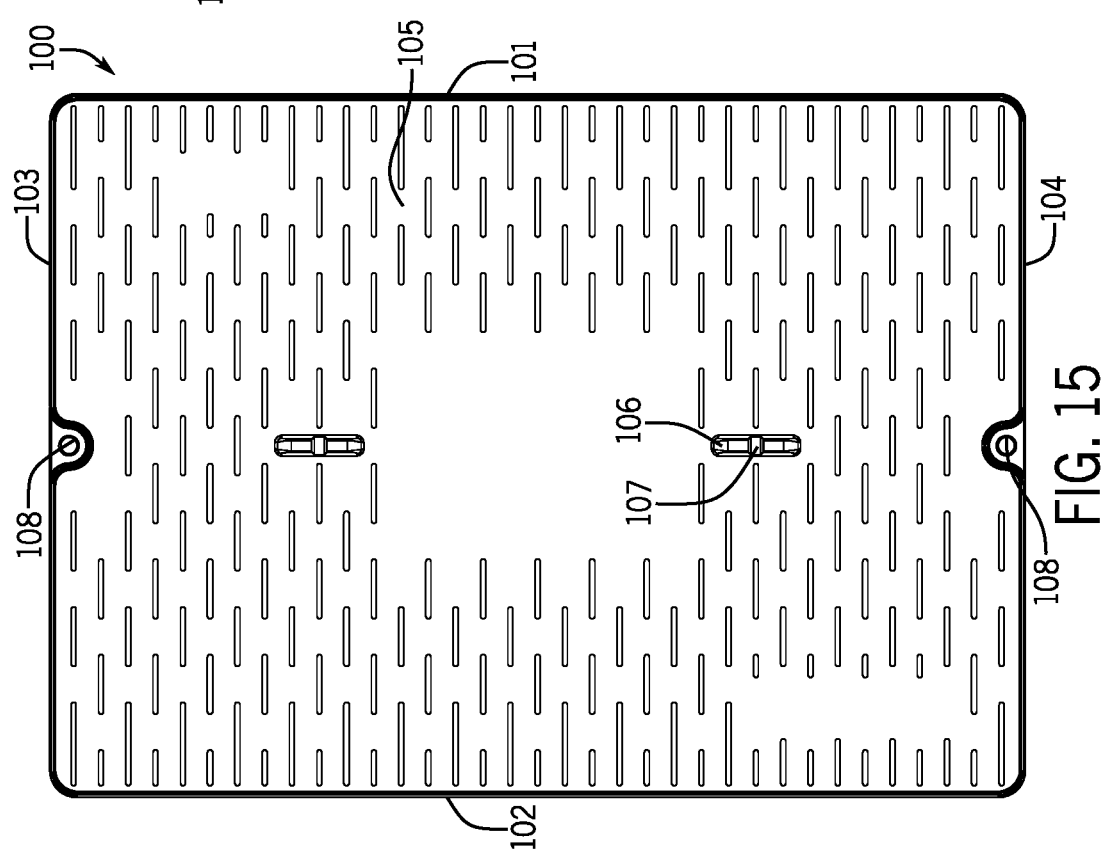
FIG. 15 shows a top view of a preferred embodiment of a lid for the utility enclosure of the present invention.

Top covers or lids for utility enclosures, under certain circumstances, may require sufficient reinforcement so that they may withstand several thousand pounds of pressure. To achieve sufficient reinforcement the lid may be made with strong plastic material, have a suitable thickness, and contain rebar. FIG. 15 shows a top view of a preferred embodiment of a lid 100 for the utility enclosure of the present invention. The lid 100 has a front end 101, and a rear end 102, a right side 103, a left side 104, and a top lid portion 105, defining an interior 113 (see FIG. 16). There are two recesses 106 on the top lid portion 105. Within the recess 106 is a lift pin 107. A lifting tool can be inserted into the recess 106 and under the lift pin 107 to lift the lid 100 off a utility enclosure. Each side 103 and 104 has bolt holes 108 for bolting the lid 100 to the top of a utility enclosure.

Figure 16:
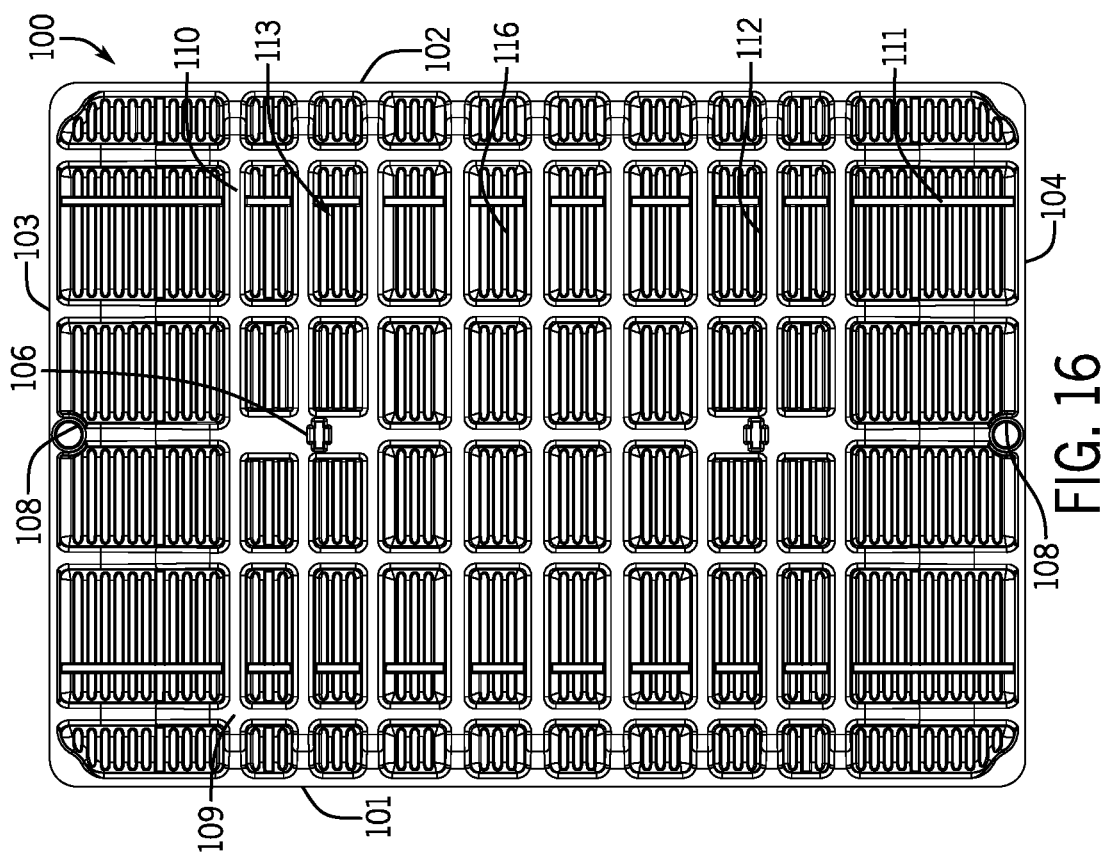
FIG. 16 shows a bottom view of the lid.

FIG. 16 shows a bottom view of the lid 100. The lid 100 has an open bottom 109 with large size reinforcement ribs 110 attached to an interior surface 116 of the top lid portion 105. The large size reinforcement ribs 110 extend from the front end 101 to the rear end 102 and from the right side 103 to the left side 104. The large size reinforcement ribs 110 crisscross forming a lattice-type structure, with medium size reinforcement ribs 111 and small size reinforcement ribs 112 mounted in spaces formed by the lattice type structure. The large size reinforcement ribs 110 are larger than the medium size reinforcement ribs 111 and the small size reinforcement ribs 112, and the medium size reinforcement ribs 111 are larger than the small size reinforcement ribs 112.

Figure 17:
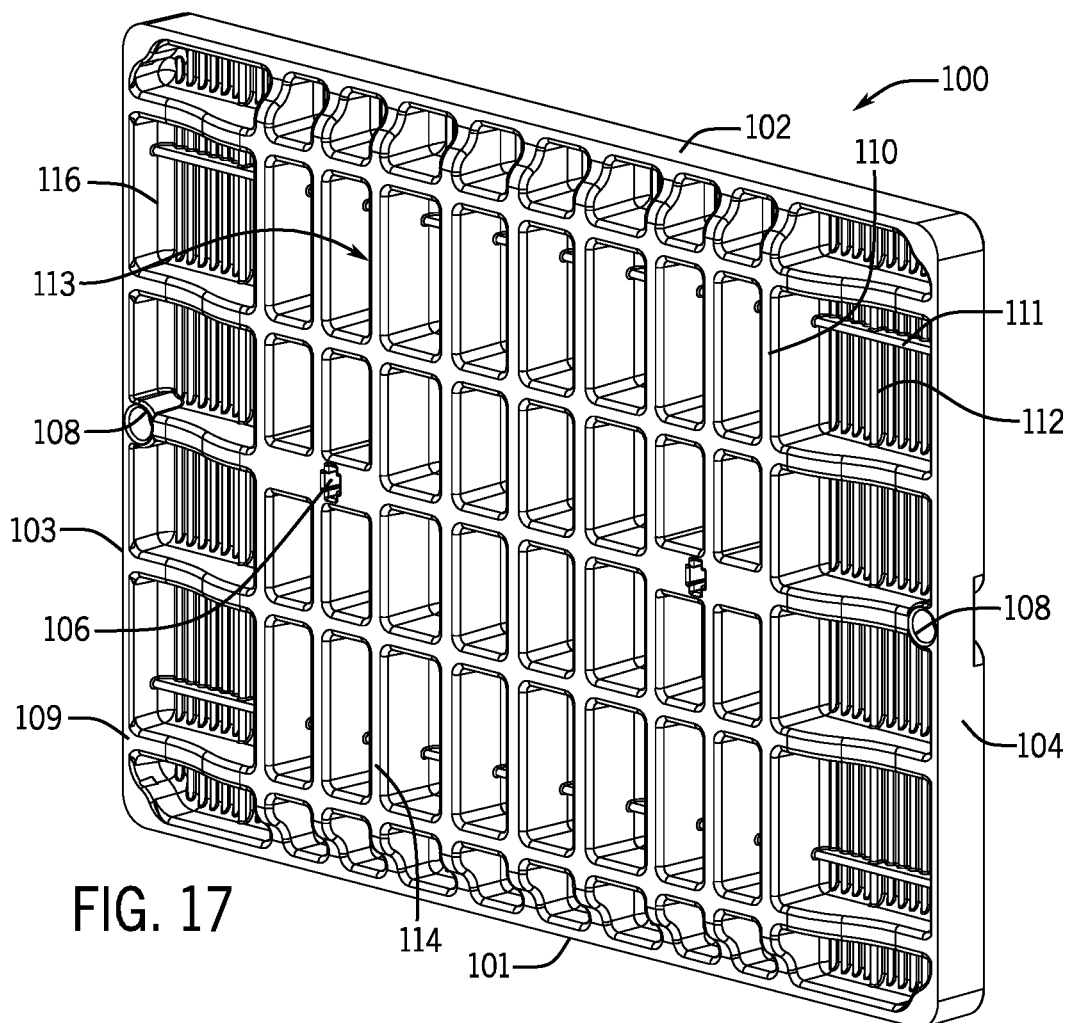
FIG. 17 shows a rear, bottom, perspective view of the lid.

FIG. 17 shows a rear, bottom, perspective view of the lid 100. FIG. 17 further illustrates the interior surface 116 and the lattice-type structure, with medium size and small size reinforcement ribs in the spaces of the lattice-type structure.

Figure 18:
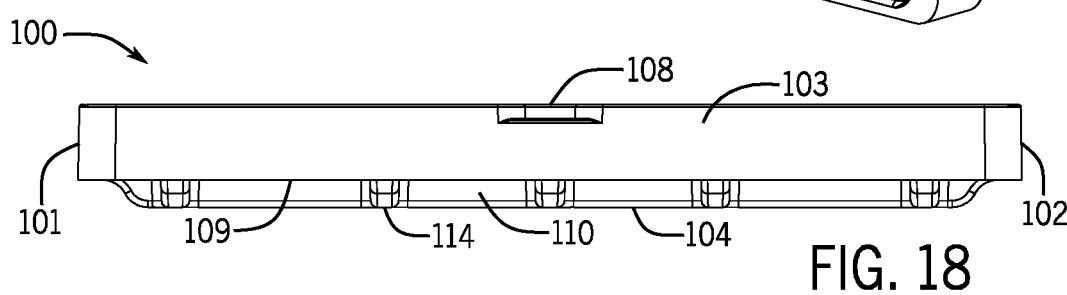
FIG. 18 shows a front-end view of the lid.

FIG. 18 shows a front-end view of the lid 100. FIG. 18 shows that the bottom 114 of the large reinforcement ribs 110 extends below the bottom 109 of the lid 100. The large reinforcement ribs 110 must be of sufficient size to sufficiently reinforce the lid to resist 33,750 pounds of force.

Figure 19:
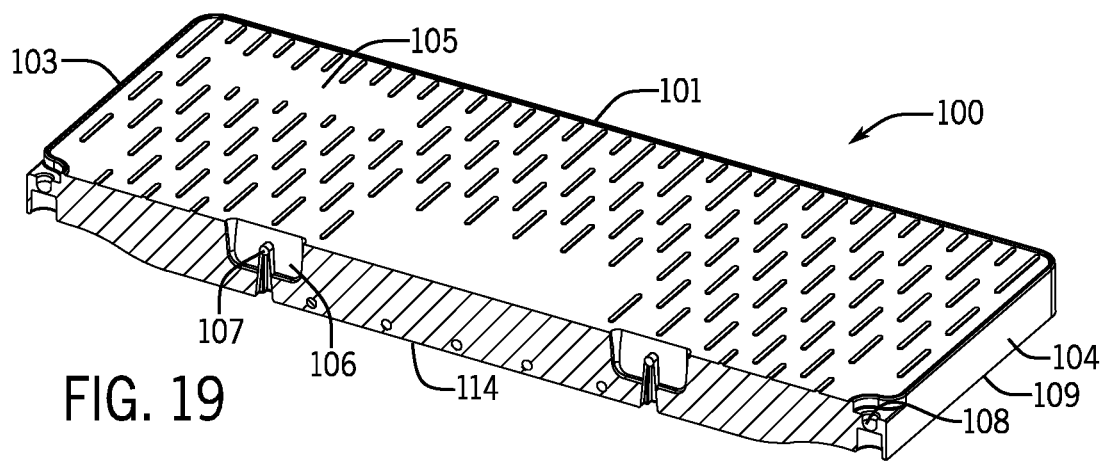
FIG. 19 shows a rear, top, perspective, sectional view of the lid.

FIG. 19 shows a rear, top, perspective, sectional view of the lid 100. The recess 106 is of sufficient size so that a lift tool can be inserted into the recess 106. Lift pin 107 extends across the recess 106 so that a lift tool can be positioned under the lift pin 107 and can lift the lid 100 off the top of a utility enclosure.

Figure 20:
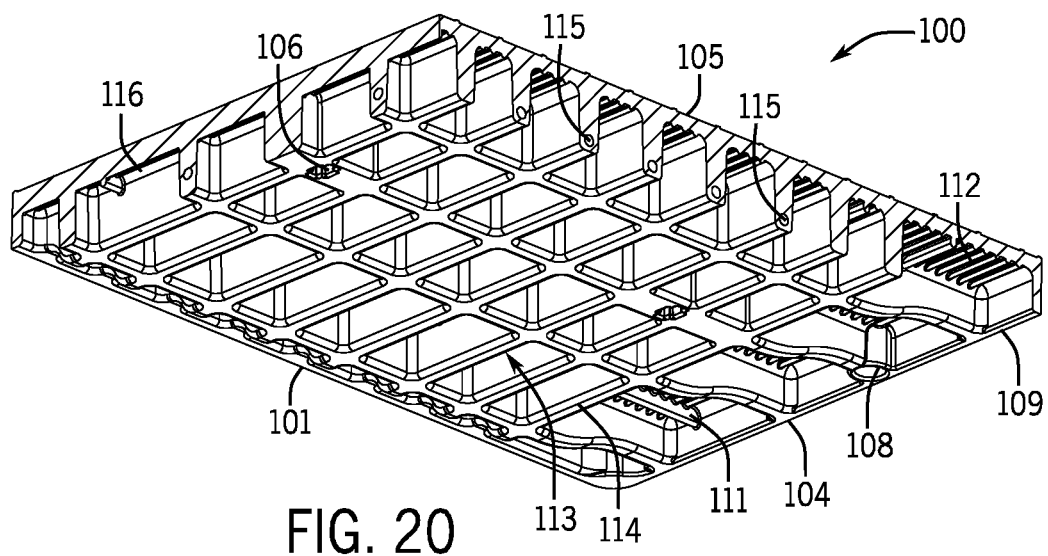
FIG. 20 shows a bottom perspective sectional view of the lid.

FIG. 20 shows a bottom, perspective, sectional view of the lid 100. FIG. 20 further shows the positioning of metal rods or rebar 115 in the large reinforcement ribs 110. The rebar 115 is near the bottom end 114 of the large reinforcement ribs 110 but is positioned above the bottom end 114. During the molding process of the lid 100 the rebar tends to settle to the bottom 114 of non-solidified large reinforcement ribs 110. That settling of the rebar 115 would prevent the rebar 115 from being properly encased in the large reinforcement ribs 110. To prevent this settling a stud cradle is used in a mold to support the rebar 115 above the bottom 114 of the large reinforcements rib 110. When the lid 100 is removed from the mold after curing the stud cradle remains in the mold.

Figure 21:
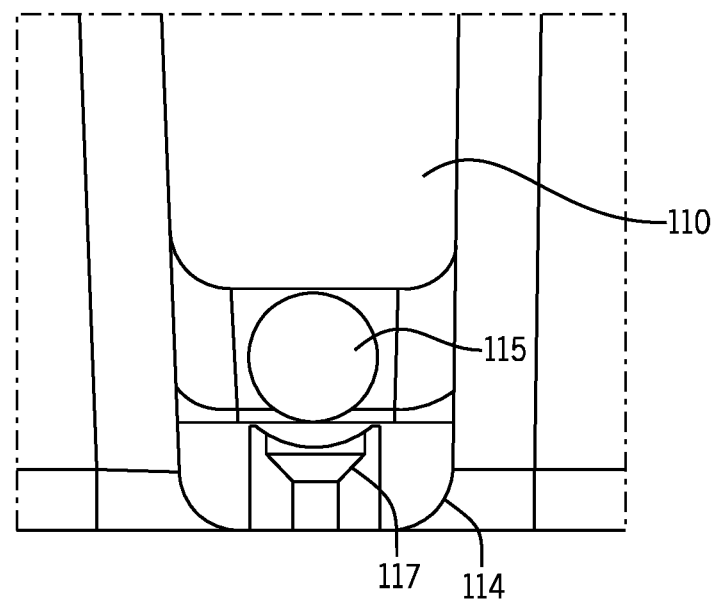
FIG. 21 shows an enlarged view of rebar positioned in a large reinforcement rib of the lid.

FIG. 21 shows an enlarged view of rebar 115 positioned in a large reinforcement rib 110 of the lid 100 near the bottom 114 of the large reinforcement rib 110 and spaced above the bottom 114. FIG. 21 further shows a void 117 of a stud cradle which is removed from the lid 100 when the lid 100 is removed from the mold.

The lid 100 is made with a thermoplastic, preferably with polypropylene containing glass fiber and preferably in the amount of 15% to 40%. Glass fiber-reinforced polypropylene has improved dimensional stability, resistance to warpage, rigidity, and strength. Heat deflection temperature at 264 psi is increased up to 300° F. (150° C.) for 40% glass fiber reinforced polypropylene. Polypropylene's coefficient of thermal expansion is cut in half with 40% glass reinforcement. Glass fiber-reinforced polypropylene has good impact strength, very good mold filling capability, excellent stiffness, good dimensional stability, and low creep under load at elevated temperatures (RTP Company, Winona, Minn.). The physical structure of the lid as described above and its composition consisting essentially of glass fiber-reinforced polypropylene are constructed so that the lid withstands up to 33,750 pounds of force without breaking or being deformed.

Figure 22:
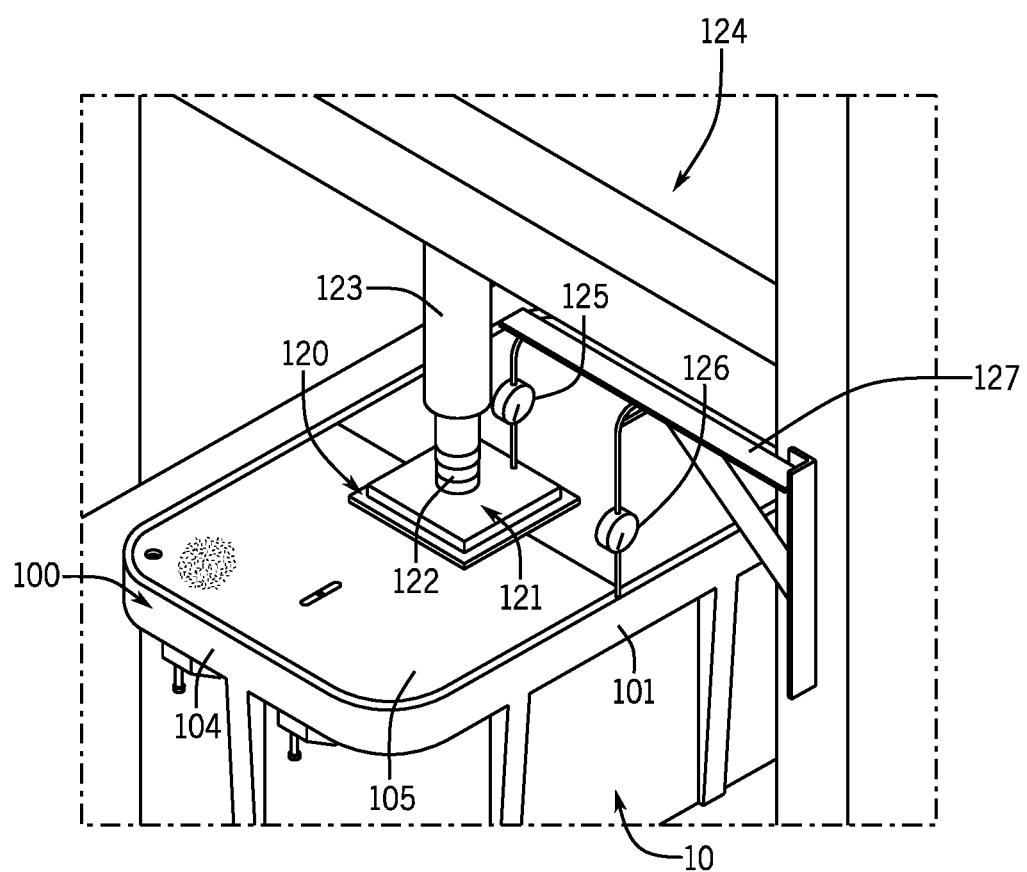
FIG. 22 illustrates a testing device for measuring the load strength of the lid as described in ANSI/SCTE 77.

FIG. 22 illustrates a testing device for measuring the load strength of the lid as described in ANSI/SCTE 77. The lid 100 is tested while sitting on the interior ledge 18 of the utility enclosure 10. A rubber load plate 120 is centered on the top 105 of the lid 100 and a 10-inch by 10-inch by 1-inch steel load plate (Tier 15) or 10-inch by 20-inch by 1-inch steel load plate (Tier 22) 121 is centered on the rubber plate 120. A load frame 124 is centered over the top portion 105 and a hydraulic load device 123 engages the 1-inch steel load plate 121. Increasing force, perpendicular to the top lid portion 105, is applied to a center of the steel plate 121 until the lid 100 bends or is deformed. Linear measurement gauges 125 and 126 are mounted to a measurement gauge mounting arm 127 to measure the amount of displacement to the top 105 of lid 100.

The foregoing description illustrates and describes the disclosure. Additionally, the disclosure shows and describes only the preferred embodiments but, it is to be understood that the preferred embodiments are capable of being formed in various other combinations, modifications, and environments and are capable of changes or modifications within the scope of the invention concepts as expressed herein, commensurate with the above teachings and/or the skill or knowledge of the relevant art. The embodiments described herein above are further intended to explain the best modes known by applicant and to enable others skilled in the art to utilize the disclosure in such, or other, embodiments and with the various modifications required by the particular applications or uses thereof. Accordingly, the description is not intended to limit the invention to the form disclosed herein. Also, it is intended that the appended claims be construed to include alternative embodiments. It will be further understood that various changes in the details, materials, and arrangements of the parts which have been described and illustrated above in order to explain the nature of this invention may be made by those skilled in the art without departing from the principle and scope of the invention as recited in the following claims.

We claim:

1. A lid for a utility enclosure, comprising:
   a) a front end, a rear end, a right side, a left side, a top lid portion, and a bottom, defining an interior;
   b) first reinforcement ribs on an interior surface of the top lid portion;
   c) metal bars embedded in the first reinforcement ribs; and
   d) the lid is made of glass fiber-reinforced thermoplastic; wherein the first reinforcement ribs form a lattice-type structure, with second reinforcement ribs mounted in spaces formed by the lattice type structure.

2. The lid of claim 1, wherein the metal bars are positioned in the first reinforcement ribs near a bottom of the first reinforcement ribs and spaced above the bottom of the first reinforcement ribs.

3. The lid of claim 1, further comprising the top lid portion having a recess with a lift pin therein.

4. The lid of claim 1, further comprising the top lid portion having bolt holes to bolt the lid to the utility enclosure.

5. The lid of claim 1, wherein the lid is constructed to withstand up to 33,750 pounds of force without breaking or being deformed.

6. A lid for a utility enclosure, comprising:
   a front end, a rear end, a right side, a left side, a top lid portion, and a bottom, defining an interior;
   first reinforcement ribs on an interior surface of the top lid portion;
   metal bars embedded in the first reinforcement ribs; and
   the lid is made of glass fiber-reinforced thermoplastic;
   wherein the top lid portion has a recess with a lift pin therein.

7. The lid of claim 6, wherein the metal bars are positioned in the first reinforcement ribs near a bottom of the first reinforcement ribs and spaced above the bottom of the first reinforcement ribs.

8. The lid of claim 6, further comprising the top lid portion having bolt holes to bolt the lid to the utility enclosure.

9. The lid of claim 6, wherein the lid is constructed to withstand up to 33,750 pounds of force without breaking or being deformed.

10. A lid for a utility enclosure, comprising:
    a front end, a rear end, a right side, a left side, a top lid portion, and a bottom, defining an interior;
    first reinforcement ribs on an interior surface of the top lid portion;
    metal bars embedded in the first reinforcement ribs; and
    the lid is made of glass fiber-reinforced thermoplastic;
    wherein the lid is constructed to withstand up to 33,750 pounds of force without breaking or being deformed.

11. The lid of claim 10, wherein the metal bars are positioned in the first reinforcement ribs near a bottom of the first reinforcement ribs and spaced above the bottom of the first reinforcement ribs.

12. The lid of claim 10, further comprising the top lid portion having bolt holes to bolt the lid to the utility enclosure.

* * * * *